Dec. 16, 1947.  A. J. NEWMAN  2,432,786
MACHINE FOR TESTING AND MARKING PARTS MAGNETICALLY
Filed Nov. 20, 1943  5 Sheets-Sheet 1

INVENTOR.
ALBERT J. NEWMAN
BY
ATTORNEY

Dec. 16, 1947.  A. J. NEWMAN  2,432,786
MACHINE FOR TESTING AND MARKING PARTS MAGNETICALLY
Filed Nov. 20, 1943  5 Sheets-Sheet 3
FIG. 3
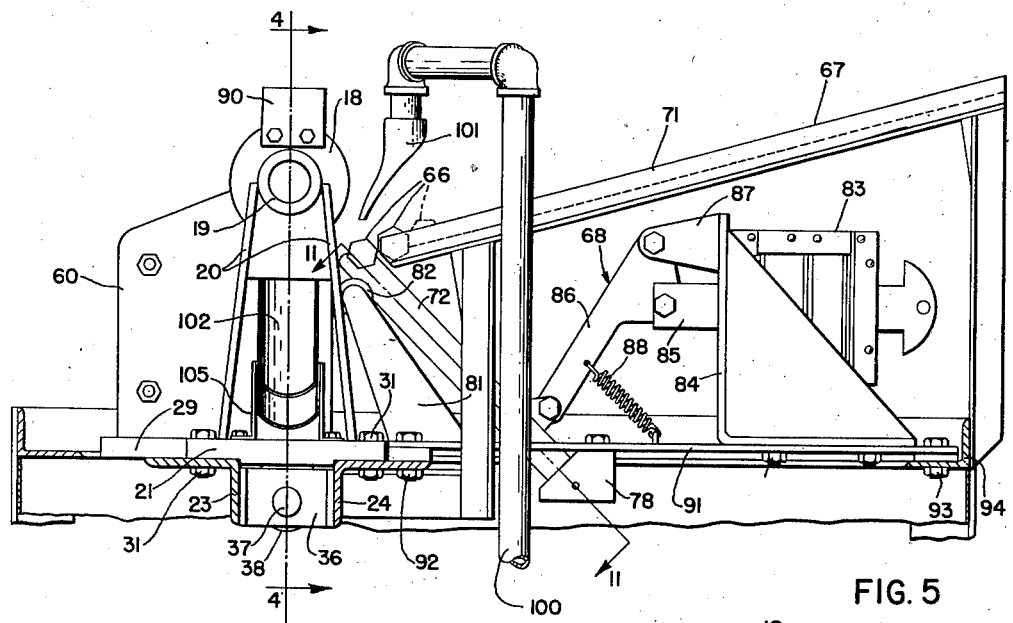
FIG. 4
FIG. 5
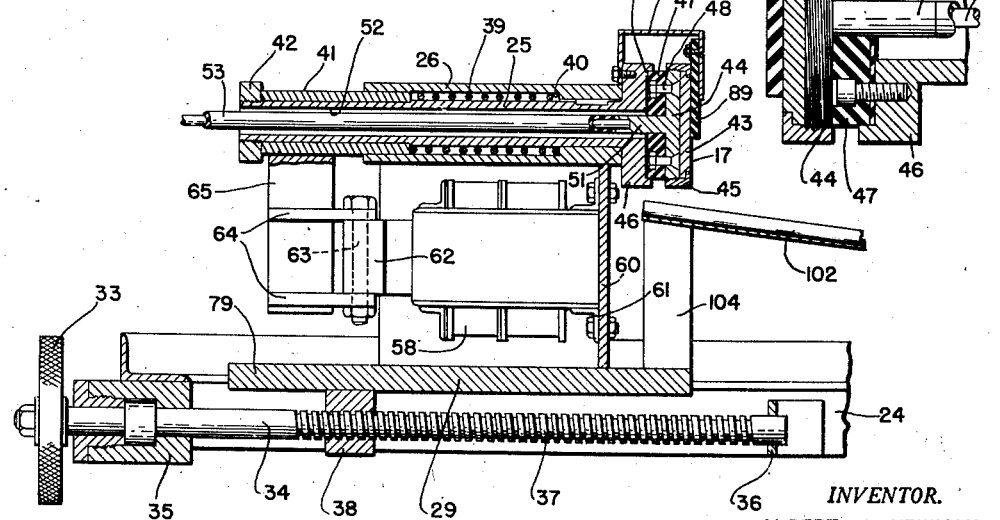
INVENTOR.
ALBERT J. NEWMAN
BY
ATTORNEY

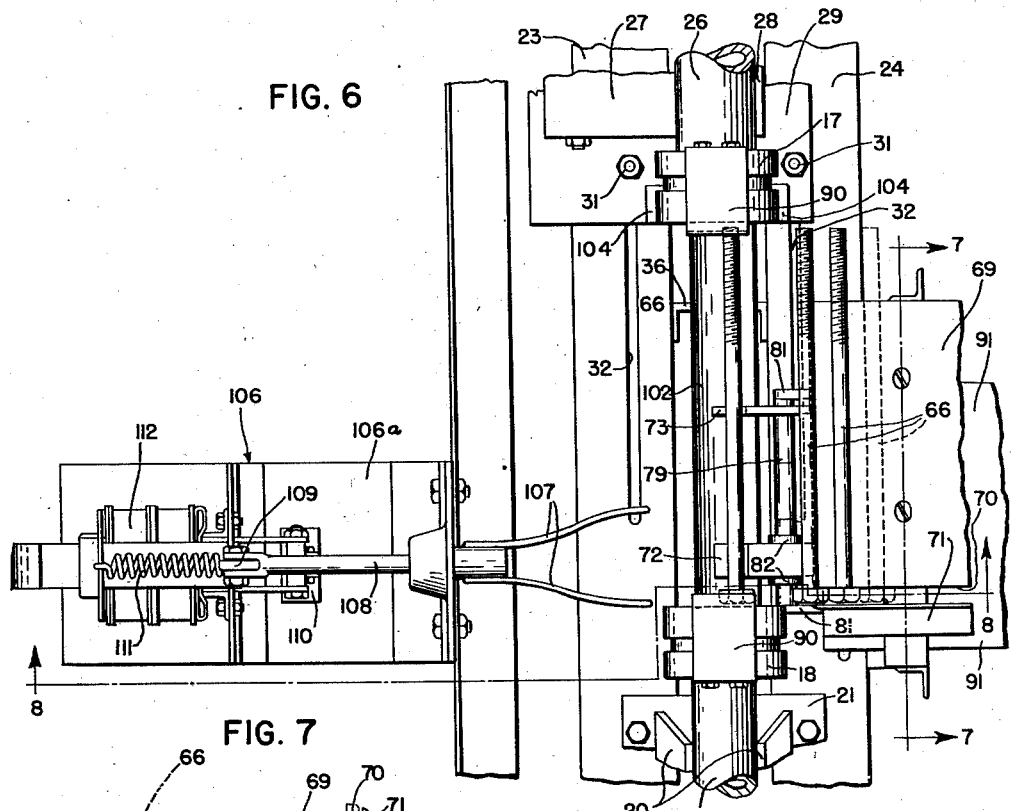
FIG. 6
FIG. 7
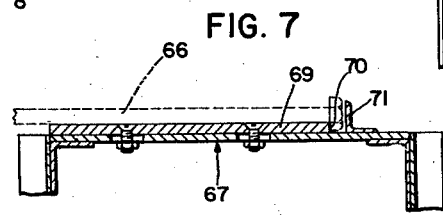
FIG. 8
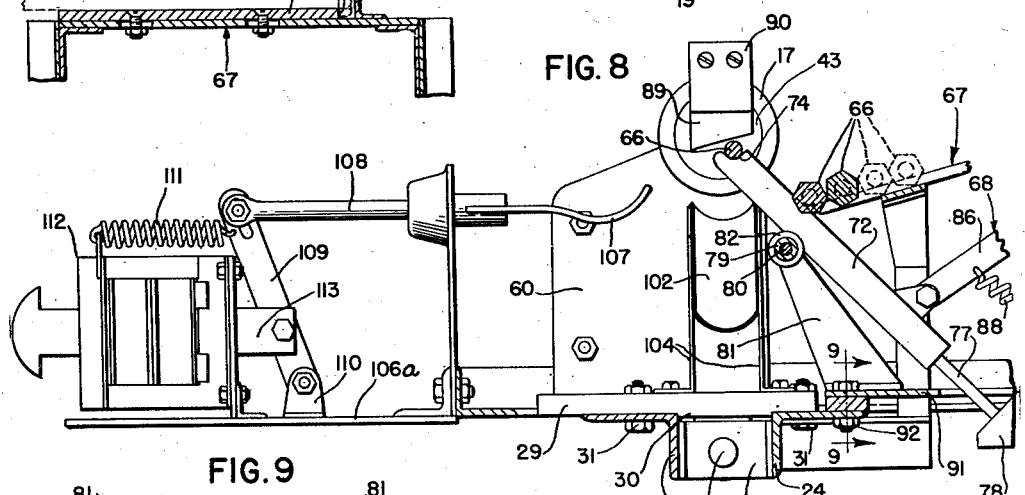
FIG. 9
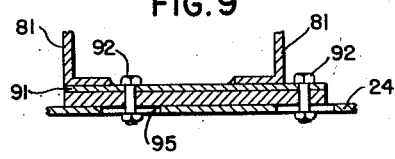
INVENTOR.
ALBERT J. NEWMAN
BY
ATTORNEY Dec. 16, 1947.   A. J. NEWMAN   2,432,786
MACHINE FOR TESTING AND MARKING PARTS MAGNETICALLY
Filed Nov. 20, 1943    5 Sheets-Sheet 5
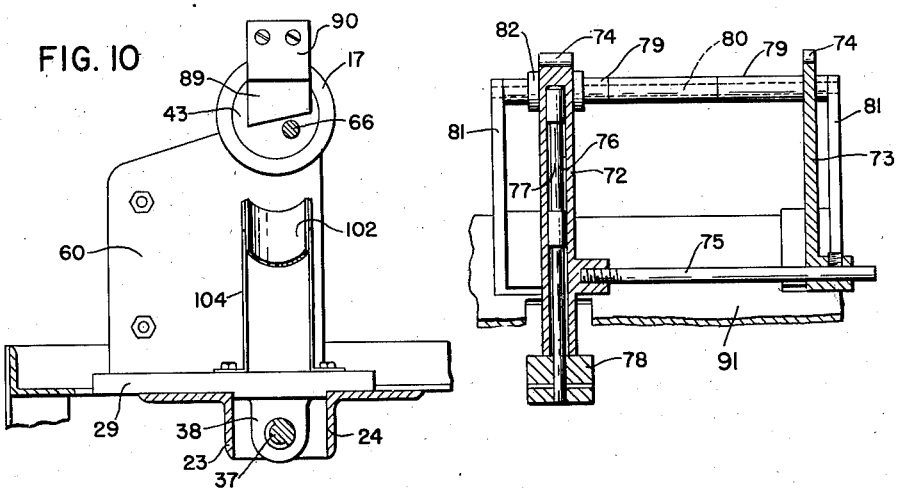
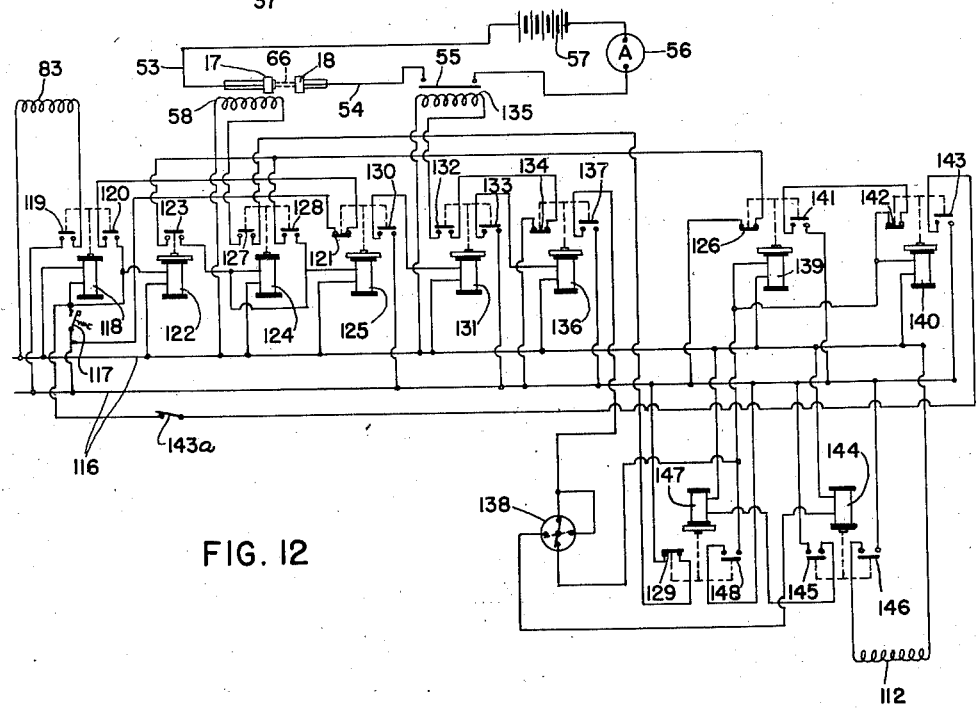
INVENTOR.
ALBERT J. NEWMAN
BY
ATTORNEY Patented Dec. 16, 1947

2,432,786

UNITED STATES PATENT OFFICE 2,432,786

MACHINE FOR TESTING AND MARKING PARTS MAGNETICALLY

Albert J. Newman, Kenmore, N. Y., assignor to Curtiss-Wright Corporation, a corporation of Delaware Application November 20, 1943, Serial No. 511,189

7 Claims. (Cl. 175—183)

This invention relates to a machine for testing articles and structural parts to determine if any of such parts are defective or have faults which may render them unsafe or otherwise unsuitable for the purpose for which they are intended; and more particularly the invention is concerned with a machine of the kind which applies a magnetically sensitive film to each part and then magnetizes the part and utilizes the magnetic field which is set up to modify the film and thereby provide a visual indication of any faults which may be present.

A machine of the type generally described is characterized by spaced jaws which provide electrodes and between which the article or part to be tested is clamped after a magnetically sensitive coating has been applied. A direct current circuit which includes the jaws, and hence the part clamped between them, is then established. The part being a conductor, a magnetic field is set up about it, the lines of force about the part, as in any conductor through which a current flows, being in the form of concentric circles around the axis of the part. The strength of the magnetic field thus set up around the part is, assuming the part to be free of any faults, of substantially uniform strength throughout the length of the part. However, if there are any faults, in the part in the form of cracks, holes, pockets of slag, or poor grain structure, the high flux leakage which will occur at these points will be marked out or evidenced by a concentration of the particles of the magnetically sensitive film around the areas in which the faults are located, the degree of concentration or film density of the rearranged film particles and the configurations of the concentrations indicating the extent and nature of such faults.

One object of the invention is to provide a machine which will through magnetic agencies mark the parts clearly and accurately to indicate the location, extent and nature of any defects or faults.

A further object is to provide a machine which will accommodate parts of various sizes and shapes.

A still further object is to provide a machine which may be operated to test the parts rapidly without injury either to the parts or to the machine.

A still further object is to provide a machine which may be adjusted with facility to regulate, at will, the speed at which the testing and marking operations are performed.

A still further object is a novel design and arrangement of the parts of the machine, whereby to obtain simplicity and compactness in construction.

The invention is illustrated in the accompanying drawings, in which—

Figure 3 is a vertical section taken along line 3—3 of Figure 2.

Figure 4 is a similar section taken along line 4—4 of Figure 3.

Figure 5 is an enlarged detail section taken along line 5—5 of Figure 2.

Figure 6 is a fragmentary top plan view of the machine.

Figure 7 is a detail section taken along line 7—7 of Figure 6.

Figure 8 is a transverse section taken along line 8—8 of Figure 6.

Figure 9 is a detail section taken along line 9—9 of Figure 8.

Figure 10 is a vertical section taken along line 10—10 of Figure 2.

Figure 11 is a section taken along line 11 of Figure 3.

Figure 12 is a wiring diagram of the electric circuit for controlling the operation of the machine.

Figure 1:
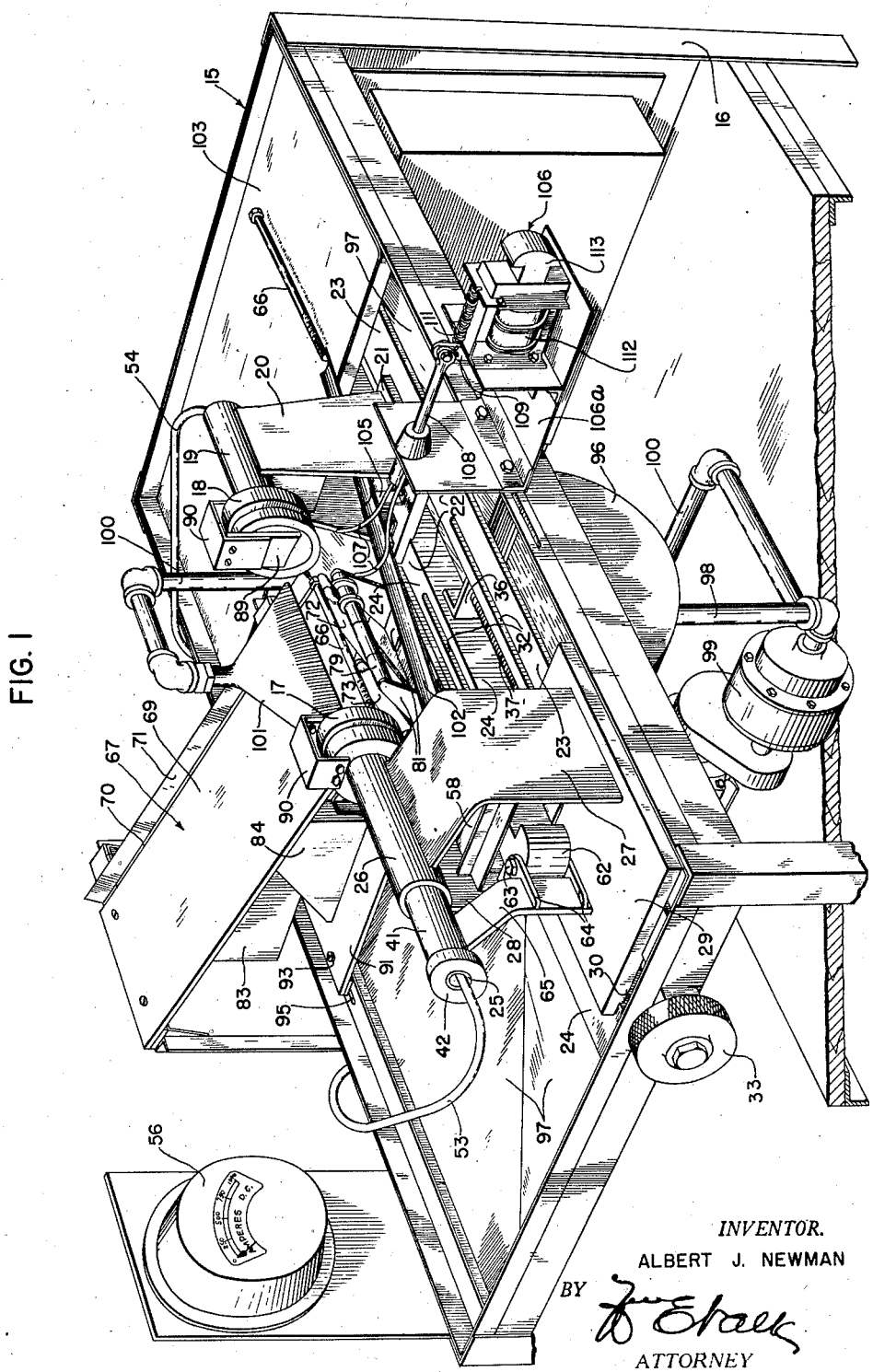
Figure 1 is a perspective view of a machine in which the features of the invention are incorporated.
Figure 2:
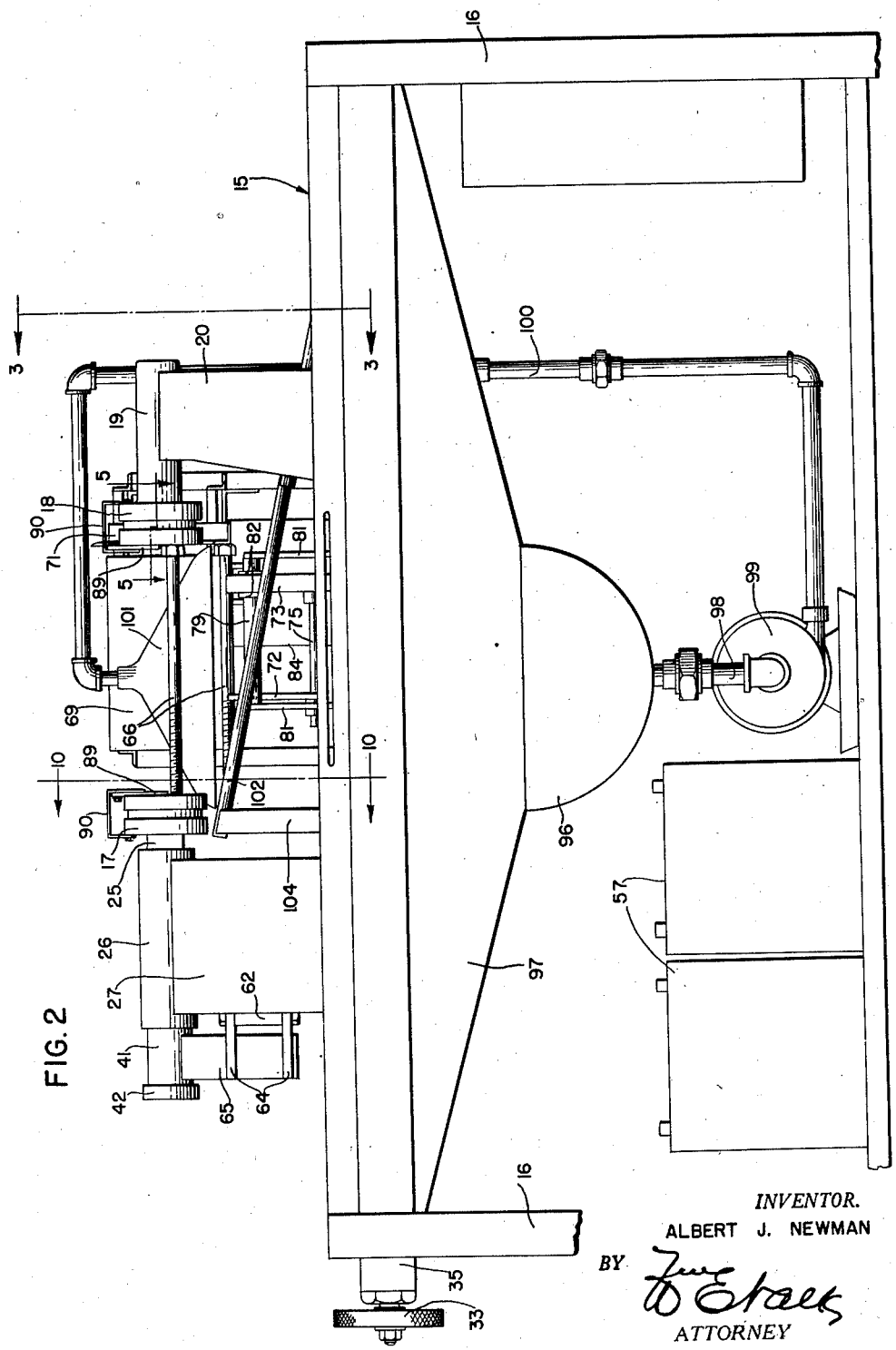
Figure 2 is a front elevation of the machine.

The machine is available for testing various kinds of machine and structural parts. By way of example, it is illustrated and described in connection with the testing and marking of bolts preparatory to inspection of the latter to eliminate those having faults which render them unsuitable for the purpose for which they are intended.

The various mechanisms and associated parts of the machine are mounted in a suitable frame 15, legs 16 of the latter supporting said mechanisms and parts so that the bolts will be within sight and conveniently accessible to the operator at all times. As illustrated, the machine includes cooperating jaws 17 and 18 (Figure 1) between which the parts to be tested are adapted to be clamped, the jaw 18 being stationary and having a tubular body 19 which is mounted between uprights 20. The latter are carried by a plate 21 which bridges, and the opposite sides of which are secured to, horizontal flanges 22 of parallel, spaced-apart angle members 23 and 24. The jaw 17, which is movable toward and away from the jaw 18, is formed with a tubular body 25 (Figure 4) which is accommodated in a barrel 26, the latter being supported by legs 27 and 28 upon a carriage 29 which is mounted upon the angle members 23 and 24. The vertical flanges of the angle members provide a guideway for a longitudinal rib 30 which is formed on the under side of the carriage. Bolts 31 (Figure 6) which secure the carriage to the angle members are accommodated in longitudinally extending slots 32 which are formed in the horizontal flanges 22. Provision is thus made for supporting the barrel 26 so that the jaw 17 may be located in the desired relation with respect to the jaw 18. The carriage 29 may be adjusted along the angle members 23 and 24, when the bolts 31 have been loosened, by a handwheel 33 which is carried by the outer end of a shaft 34 (Figure 4). The said shaft is journaled at its opposite ends in suitable bearings 35 and 36 secured to and between the angle members 23 and 24 and is formed with a threaded section 37 which has a screw connection with a block 38 suitable secured to the under side of the carriage. Normally the jaw 17 is held in a retracted position against the inner end of the barrel 26 by a spring 39 (Figure 4), the said spring being arranged around the tubular body 25 and acting against an annular shoulder 40 in the bore of the barrel and the inner end of a sleeve 41 which is secured on the outer end of the tubular body by a nut 42.

The jaws 17 and 18 are adapted to serve as electrodes for connecting the parts to be tested and marked to a source of direct current so that they may be magnetized by causing a current to flow through them. To this end each of said jaws (Figures 4 and 5) includes a face plate 43 in the form of a disc and of soft metal such as lead, for example, and a similarly-shaped backing plate 44 of copper or other material having good electrically conductive properties, the two plates being secured together by a clamping ring 45. The plates 43 and 44 are carried by a head 46 but are electrically insulated from the latter by an insulating disc 47. Screws 48 (Figure 4) secure the insulating disc 47 to the back of the plate 44, the said screws being insulated from the head 46 by an insulating disc 49. Screws 50 (Figure 5) secure the disc 47 to the head 46, the heads of the screws 50 being spaced from, and hence being insulated from, the plate 44. Necks 51 on the backs of the backing plates 44 extend into bores 52 in the tubular bodies 19 and 25, but are spaced from the walls thereof, and are connected to the terminals of electrical conductors, the conductor which is connected to the electrode provided by the jaw 17 being indicated at 53 while the conductor which is connected to the electrode provided by the jaw 18 is indicated at 54. The conductors 53 and 54 are connected through a switch 55 (Figure 12) and a meter 56 to the opposite sides of a battery 57, or other source of direct current.

Movement of the jaw 17 toward the jaw 18 against the action of the spring 39 is effected by a solenoid 58 which is located under the barrel 26 between the legs 27 and 28, the solenoid being mounted upon a transverse panel 60 (Figure 4) by angle members 61. The outer end of the armature 62 of the solenoid is connected by a pivot pin 63 to and between lateral extensions 64 on the lower end of an arm 65, the upper end of the said arm being welded, or otherwise secured, to the outer end of the sleeve 41.

The bolts 66 to be tested are arranged crosswise in an inclined chute 67 down which they are adapted to roll by gravity to a feed mechanism 68. The upper side of a plate 69 provides a supporting surface for the bolts, one edge 70 of the plate and an angle member 71 (Figure 7) providing a channel for accommodating the heads of the bolts when the latter are headed, as illustrated.

The feed mechanism 68 is adapted to receive the bolts 66 from the chute and move them, one at a time, to a position between the jaws 17 and 18. To this end the said mechanism includes spaced arms 72 and 73 which are notched as at 74 at their upper ends to support a bolt. The two arms are movable as a unit, being connected by a cross rod 75 (Figure 11). A bore 76 which is formed in the arm 72 accommodates a guide rod 77 which is suitably secured at its lower end to a block 78. At their upper ends the arms 72 and 73 ride upon tubular rollers 79 which are carried by a shaft 80, the latter being mounted between the upper ends of brackets 81 and the roller provided for the arm 72 being formed with spaced, annular collars 82 between which the said arm moves.

The arms 72 and 73 normally occupy positions in which the leading bolt in the magazine will roll onto their notched upper ends. They are advanced to move the said bolt to a position between the jaws 17 and 18 by a solenoid 83 (Figure 3) which is mounted upon a bracket 84. An extension 85 of the armature of the said solenoid is connected to a lever 86 which is connected at its lower end to the arm 72 and at its upper end to an extension 87 of the bracket. A spring 88 acts against the lever 86 normally to hold the arms 72 and 73 and the armature of the solenoid in their retracted positions, the spring being yieldable, however, when the solenoid is energized to permit the arms to move the bolt which they may hold at the time to the position in which it is to be clamped between the jaws. As the arms 72 and 73 are advanced rapidly, it is preferred that the jaws carry stops 89 in the form of rubber pads or the like. The stops, which may be secured to the jaws by straps 90, prevent movement of the bolts by inertia beyond the position at which it is desired they be gripped by the jaws, the jaws being adjusted so that when they occupy a release position and a bolt is advanced between them by the feed mechanism 68 the stops 89 overlie the ends of the bolt as best shown in Figure 6.

Preferably the feed mechanism 68 is so designed that the position to which it advances a bolt between the jaws 17 and 18 is off center with respect to the axes of the jaws, as illustrated in Figure 8. This has the advantage that when depressions are formed in the face plates 43 by the bolts and such depressions become deep enough to interfere with the proper operation of the jaws, electrically or mechanically, the face plates may be angularly adjusted to present new area for engagement with the ends of the bolts.

The feed mechanism 68 is carried by plate 91 (Figure 3), the inner end of which is secured by bolts 92 to the outer edge of the horizontal flange of the channel member 24 and the outer end of which is secured by bolts 93 to the horizontal flange of an angle member 94 of the frame. Preferably slots 95 are formed in the angle members 24 and 94 for the bolts 92 and 93 in order that the feed mechanism may be adjusted as a unit in accordance with the size and shape of the parts to be tested. In this connection it will be noted that the arms 72 and 73 engage the parts to be tested at spaced points. In the event that the length of such parts is such as not to require, or permit, the use of two arms, the arms 73 and the rod 75 may be detached.

The magnetically sensitive material which is to be applied to the bolts is preferably in the form of a suspension which may consist of iron oxide, a dispersing agent and a liquid in which the iron oxide is held in suspension, a body of the suspension being maintained in a sump 96. The latter is carried by, and is part of, a drainage pan 97. The suspension is withdrawn from the sump 96 through a pipe 98 by a motor-driven pump 99 and conducted by a pipe 100 to a nozzle 101 which is located over the bolt which occupies the notched upper ends of the arms 72 and 73 of the feed mechanism. The suspension withdrawn from the sump 96 is directed upon the bolt in the form of a continuous discharge, the excess suspension draining back into the pan 97. A film of the magnetically sensitive material is, therefore, applied to each bolt as the latter pauses below the nozzle 101 and just prior to the time the feeding mechanism moves it to the position in which it is to be gripped by the jaws 17 and 18.

After the bolt has been coated and the solenoid 83 has been energized to move it between the jaws, the solenoid 58 is energized to advance the jaw 17 toward jaw 18 to thereby clamp and support the bolt between the face plates 43. The solenoid 83 is then deenergized to permit the arms of the feed mechanism to be returned to receive another bolt from the magazine. After the arms of the feed mechanism have been withdrawn, the switch 55 (Figure 12) is closed in a manner to be described hereinafter and current is caused to flow through the bolt which is supported between the jaws 17 and 18. A magnetic field is thus set up about the bolt, the circular lines of force of the field being concentric with the axis of the bolt. Any fault in the bolt, particularly one extending lengthwise of the latter, will, therefore, be clearly indicated, as it will permit a flux leakage which will cause a concentration of the oxide particles along the edges of such fault.

After the bolt has been magnetized in the manner and for the purpose described, the switch 55 is opened to break the circuit through the bolt and the solenoid 58 is deenergized to permit the spring 39 to restore the jaw 17 to its normal retracted position. The bolt which is thus released falls into a chute 102 down which it slides into a tray 103. It is then inspected and such disposition made of it as indicated to be proper by the condition of its coating. The chute 102, as illustrated, is sectional so that it may be extended and collapsed as may be necessary to permit adjustment of the carriage 29 in the manner described. The upper end of the upper chute section is mounted on the carriage 29 between legs 104 (Figure 10) while the lower end of the upper section is supported in the upper end of the lower section, the upper end of the latter being carried by legs 105 while the lower end thereof rests upon the rim of the tray 103.

It will be noted that the heads of the bolts engage the surface on which the bolts may rest, or over which they may slide, after the magnetizing operation to prevent such surface from rubbing against the bodies of the bolts and thereby impair or render ineffective any markings which may have been made in the manner described. When the bolts are headless, it is preferred, as best shown in Figures 1, 6 and 8, to catch the bolts as they are released by the jaws and thereby permit them to be removed from the machine before they slide down the chute 102. For this purpose a catcher 106 is located between the jaws 17 and 18 opposite the feed mechanism, the parts of the catcher being carried by a bracket 106a which is adjustably secured to a longitudinal member of the frame 15. The said catcher includes fingers 107 which are carried by a rod 108. A lever 109, which at its upper end is connected to the outer end of the rod 108, is pivotally connected at its lower end to a fixed bracket 110. Normally a spring 111 acts against the lever 109 to hold the fingers 107 in their retracted positions. An armature 113 of a solenoid 112, however, is operative, when the solenoid is energized, to move the fingers 107 below the bolt supported between the jaws 17 and 18 and to hold the fingers in such positions until the bolt is released. After this occurs the solenoid is deenergized and the spring 111 acts against the lever 109 to retract the latter and thereby move the bolt to one side of the jaws so that it may be removed from the machine and inspected.

An electric circuit for effecting the operation of the various mechanisms of the machine in the manner described is illustrated in Figure 12 of the drawings, alternating current supply lines for the said circuit being indicated at 116. A normally-open switch 117 may be momentarily closed to energize a relay 118 and thereby close switches 119 and 120. The closing of the switch 119 energizes the solenoid 83 of the feed mechanism 68 to cause the arms 72 and 73 of the latter to advance a part to be tested to a position between the jaws 17 and 18, while the switch 120 and a normally closed switch 121 connect the relay 118 across the lines 116 to provide a holding circuit for the relay. The closing of the switch 120 also connects a delayed-acting relay 122 across the lines 116 through the normally closed switch 121. After a momentary lag the relay 122 closes a switch 123, thereby connecting a relay 124 across the lines 116 through the switch 123 and a normally closed switch 126. The relay 124 is thereupon energized to close two normally open switches 127 and 128. The switch 127 and a normally closed switch 129 connect the solenoid 58 across the lines 116. Energization of the solenoid 58 causes the jaw 17 to advance and thereby grip between it and the companion jaw the part supported by the arms of the feed mechanism. The switch 128 is in series with the switch 126 and is operative, when closed, to connect a delayed-acting relay 125 across the supply lines. After a lag sufficient to insure proper clamping of the part to be tested between the jaws 17 and 18, the relay 129 opens the switch 121 and closes a switch 130. Opening of the switch 121 breaks the circuit through the relay 118 to permit the switch 119 to open and deenergize the solenoid 83. At the same time the switch 120 opens to break the circuit through the relay 122 and thereby open the switch 123. The arms 72 and 73 of the feed mechanism 68 are thereupon retracted by the spring 88. The relay 124, however, remains energized as the switch 128 establishes a holding circuit when the relay 124 is initially energized. Closing of the switch 130 energizes a delayed-acting relay 131. After a lag, which is provided to insure withdrawal of the arms of the feed mechanism from the part moved between the jaws 17 and 18, the relay 131 closes switches 132 and 133. The former which is in series with a normally closed switch 134 connects a solenoid 135 across the lines 116 to energize the solenoid and thereby close the switch 55. Direct current from the battery 57 is thereupon caused to flow through the part clamped between the jaws and the said part is magnetized for the purpose and in the manner described. Closing of the switch 133 energizes a delayed-acting relay 136. After a lag to permit the magnetizing current to flow for the proper time the relay 136 opens the switch 134 and closes a switch 137. The circuit through the solenoid 135 is thus opened to permit the switch 55 to open to break the magnetizing circuit. The switch 137 is in series with a two-position switch 138. When the latter is adjusted to the full-line position shown, it and the switch 137 connect two delayed-acting relays 139 and 140 across the lines 116, the relay 140 having a greater lag than the relay 139. The latter is operative to open the switch 126 and close a switch 141. Opening switch 126 breaks the circuit through, and hence deenergizes, the relay 124. Thereupon switch 127 opens to break the circuit through the solenoid 58 to permit the jaw 17 to be restored to its normal position and thereby release the part supported between it and the companion jaw. At the same time the switch 128 opens to break the circuit which includes the relay 125. The latter being thereby deenergized, the switch 121 is closed but has no effect on the relay 118 because switches 119 and 120 are open at this time. At the same time the switch 130 opens to break the circuit through the relay 131, thereby permitting switches 132 and 133 to open. The circuit through the solenoid 135, however, is already open at this time. Opening of the switch 133 breaks the circuit through the relay 136, thereby closing switch 134 and opening switch 137. At this time switch 132 is open; hence closing of the switch 134 does not energize the circuit including the solenoid 135. Opening of switch 137 does not deenergize the relay 139 because when the latter is energized and the switch 141 is closed, a holding circuit, including this switch and a normally closed switch 142, is closed. Closing of the switch 141 also closes a holding circuit through the relay 140. The relay 139 determines the dwell period between the time the magnetizing current through the part under test is interrupted and the jaw 17 is retracted to release the part. As noted, the relay 140 is timed so that in operation it lags the relay 139. When rendered operative, it opens the switch 142 to open the holding circuits for the relays 139 and 140 but not before first closing momentarily a switch 143 which energizes the relay 118, through a switch 143a to start anew the cycle of operations described. The machine may be shut down by opening the switch 143a. In starting the machine, it is preferred that the switch 143a be closed before the switch 117 in order to insure reenergizing of the relay 118 when the switch 143 is closed.

In the event that the catcher 106 is to be employed, the switch 138 is adjusted to the dotted-line positions indicated. The operations described will, in such case, be the same as described up to the point at which the switch 137 is closed. When this occurs a relay 144 will be energized, thereby closing switches 145 and 146. Switch 146 closes a circuit through the solenoid 112 to thereby advance the fingers of the catcher to a position below the part clamped between the jaws. The switch 145 is in series with a delayed-acting relay 147 and, when closed, connects the latter across the lines 116. Upon being rendered operative the relay 147 opens the switch 129 and closes a switch 148. The relay 147 provides a dwell period to enable the fingers of the catcher to be moved to their operative positions and, at the same period, provides an interval between the time the magnetizing current is cut off, and the time the jaw 17 is actuated to release the part. When the switch 148 is closed, it connects the relays 139 and 140 across the lines 116. The lag of 139 provides time for the part to be released and fall into the fingers of the catcher. When relay 139 is rendered operative, it opens switch 126 and closes switch 141, thereby deenergizing all circuits except those including the relays 139 and 140. These relays, therefore, complete the cycle of operations as originally described.

In connection with the foregoing it will be noted that the relay 140 is rendered operative after the relay 139 and that, once the machine is in operation, it starts each new cycle of operations. It will be apparent, therefore, that by properly timing the relay 140 the duration of each cycle may be predetermined in accordance with the speed at which the subsequent inspecting operations are to be carried out.

From the foregoing it will be apparent that the suspension containing the magnetically sensitive material is freely applied to the part which is to be tested until the time the feed mechanism advances it to a position between the jaws 17 and 18 and that the magnetizing current is caused to traverse the part as soon as the latter has been gripped by the jaws and the feed mechanism has been retracted. The film is in a highly fluid state at such time and the iron oxide particles, therefore, are free to respond to the influence of the magnetic field set upon about the part. Hence a clear and definite marking of the location, nature and outline of any fault which may be present is insured. In this connection it will be noted that as the part is held between the jaws 17 and 18 by a clamping action while the part is being magnetized, impairment of any markings which may be produced will be prevented. It will also be noted that the use of the catching mechanism to receive the parts released by the jaws when the parts are headless also minimizes defacement of the markings. The use of such a mechanism when the parts have heads is unnecessary as the heads of the parts will engage the walls of the chute and support the parts so that substantially throughout their entire extent they will have no contact with such walls.

The machine has the further advantage that it may be operated to test and mark the parts rapidly without damaging either the parts or the machine, the adjustability of the carriage 29 enabling the parts to be clamped and released with a minimum travel of the jaw 17 while the rubber stops 89 on the jaws 17 and 18 permit the feed mechanism to move the parts rapidly from the magazine to the desired position between the jaws without overtravel of the parts as a result of their inertia.

I claim as my invention:

1. In magnetic inspection apparatus, a pair of relatively movable clamping electrodes; means for automatically moving said electrodes between open and closed positions to successively receive, clamp therebetween and release parts to be inspected; a magazine for such parts; automatically reciprocating feed means for engaging and moving a part from the magazine to a station between said electrodes and thereafter retracting to receive another part from the magazine; and means for correlating the feed means with the first-mentioned means for causing a part engaged by the latter to be moved into said station when said electrodes are in open position and the feed means to retract to disengage the part subsequent to closing movement of the electrodes.

2. In magnetic inspetcion apparatus according to claim 1 wherein the feed means comprises a member recessed to receive the part and each electrode is provided with a stop for engaging the part when the latter is moved to the station between the electrodes to prevent escape of the part from said recess prior to the electrodes clamping the part therebetween.

3. In magnetic inspection apparatus, a pair of relatively movable clamping electrodes for receiving and clamping therebetween parts to be magnetically inspected, reciprocating feed means including a member having a recess to receive such part and for moving it into a station between said electrodes and thereafter retracting, and stop means for engaging the part when the latter is moved into said station to prevent escape of the part from said recess prior to the clamping operation.

4. In magnetic inspection apparatus, a pair of relatively movable clamping electrodes, means for automatically moving said electrodes between open and closed relation to successively receive, clamp therebetween and release parts to be inspected; automatically reciprocating feed means for engaging and moving such parts successively to a station between said electrodes, and thereafter retracting from said station; means for applying an electric current to said electrodes for passage through a part clamped therebetween; and means for correlating the operation of the aforementioned means for causing a part to be moved into said station when the electrodes are in open position, the feed means to retract from said station subsequent to movement of the electrodes to closed relation, and the current to be applied subsequent to such retraction of the feed means.

5. In magnetic inspection apparatus, a pair of relatively movable clamping electrodes; means for automatically moving said electrodes between open and closed relation to successively receive, clamp therebetween and release parts to be inspected; means for applying an electric current to said electrodes for passage through such part clamped therebetween, and means for correlating the operation of the aforementioned means to effect application of such current to the electrodes subsequent to closing of the electrodes and for discontinuing such application of current prior to opening of the electrodes.

6. In magnetic inspection apparatus, a pair of clamping electrodes relatively movable between open and closed positions to successively receive, clamp therebetween and release parts to be inspected; reciprocating feed means for moving such a part to a station between the electrodes when the latter are open and retracting after the electrodes have closed; means for applying an electric current to said electrodes for passage through a part clamped therebetween; and means correlating the action of the feed means and the current applying means to effect such application of current subsequent to retraction of the feed means.

7. In magnetic inspection apparatus, a pair of clamping electrodes relatively movable between open and closed position for successively receiving, clamping therebetween and releasing parts to be inspected, means for automatically feeding parts to a station between said electrodes when the electrodes are open, means for automatically applying current to the electrodes only when the latter are closed, and means for applying a liquid film of magnetically sensitive character to the parts prior to movement of them by the feeding means into said station.

ALBERT J. NEWMAN.

REFERENCES CITED

The following references are of record in the file of this patent:

UNITED STATES PATENTS

| Number | Name | Date |
| --- | --- | --- |
| 939,109 | Switzer | Nov. 2, 1909 |
| 1,456,216 | Brightman | May 22, 1923 |
| 2,217,733 | De Forest | Oct. 15, 1940 |
| 2,277,431 | Fitch | Mar. 24, 1942 |
| 701,453 | Zellers | June 3, 1902 |
| 1,758,268 | Wagner | May 13, 1930 |
| 2,234,456 | Schaurte et al. | Mar. 11, 1941 |
| 789,381 | Post | May 9, 1905 |